United States Patent [19]

Nilsson

[11] Patent Number: 4,823,989
[45] Date of Patent: Apr. 25, 1989

[54] COMPARTMENTALIZED PNEUMATIC VESSEL FILTERING AND UNLOADING SYSTEM

[75] Inventor: Allan Nilsson, Azle, Tex.

[73] Assignee: J&L Tank, Inc., Rhome, Tex.

[21] Appl. No.: 67,290

[22] Filed: Jun. 25, 1987

[51] Int. Cl.$^4$ ............................................. B65D 83/06
[52] U.S. Cl. .................................. 222/189; 222/394; 406/119; 105/251
[58] Field of Search ............... 406/119, 120, 151, 117, 406/118, 109; 222/189, 202, 630, 637, 544, 394; 280/5 C; 105/251

[56] References Cited

U.S. PATENT DOCUMENTS

| | | | |
|---|---|---|---|
| 3,069,207 | 12/1962 | Borger et al. | 406/119 |
| 3,088,777 | 5/1963 | Aller | 406/119 |
| 3,180,689 | 4/1965 | Albert | 406/119 |

*Primary Examiner*—Joseph J. Rolla
*Assistant Examiner*—Monac Beegle
*Attorney, Agent, or Firm*—Arthur F. Zobal

[57] ABSTRACT

A transportable vessel is provided formed by enclosing wall structure. Two spaced apart bulkheads separate the vessel into three compartments defined as a center compartment and two end compartments for carrying dry flowable material. The wall structure of the vessel at its upper end has at least three openings extending therethrough leading to the three compartments respectively for receiving dry flowable material into the three compartments. Three lids are provided for closing the three opening respectively whereby the vessel including the three compartments may be pressurized with air. A passageway extends through the upper portion of each of the bulkheads and a filter extends across each of the passageways for blocking the flow of dry flowable material through the passageways but allowing the flow of air therethrough. At least three separate material discharge hoppers are coupled to the wall structure of the vessel at its lower end for removing dry flowable material from each of the compartments. A first material discharge conduit is coupled to the hoppers of the two end compartments for directing the flow of dry flowable material removed from the two end compartments away from the vessel. A second material discharge conduit is coupled to the hopper of the center compartment for directing the flow of dry flowable material removed from the center compartment away from the vessel. A pneumatic conduit is coupled to the two end compartments for pressurizing the two end compartments whereby all three of the compartments will be equally pressurized by way of the bulkhead passageways, during the removal of dry flowable material from the two end compartments or from the center compartment.

24 Claims, 6 Drawing Sheets

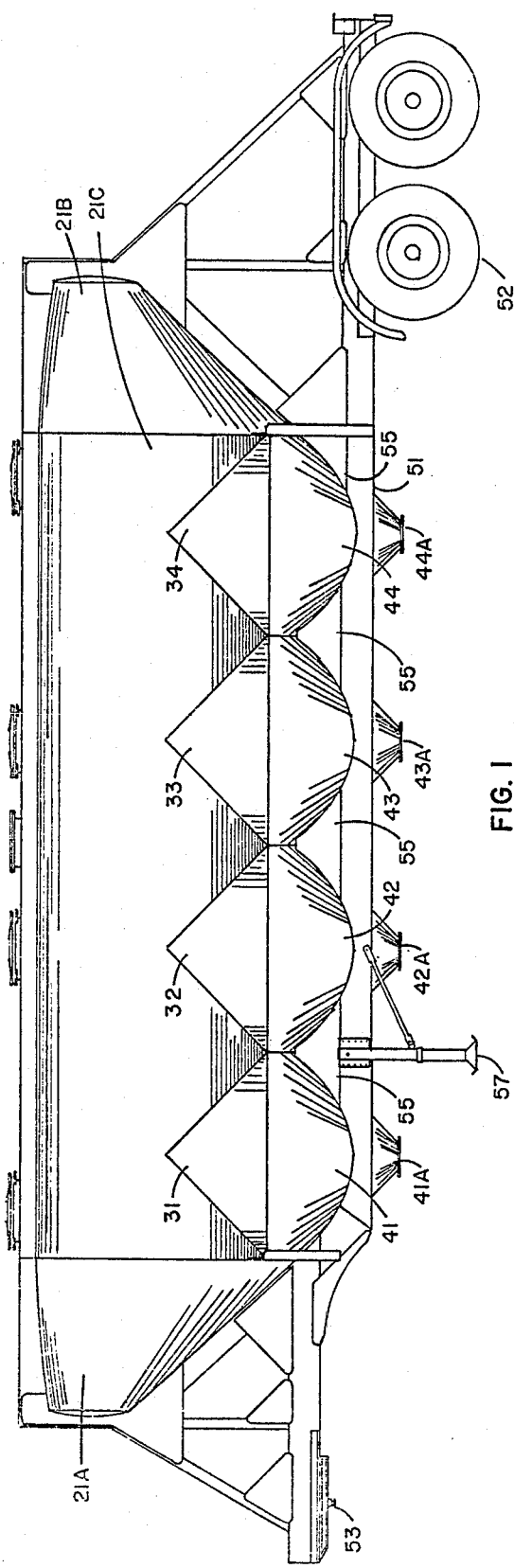
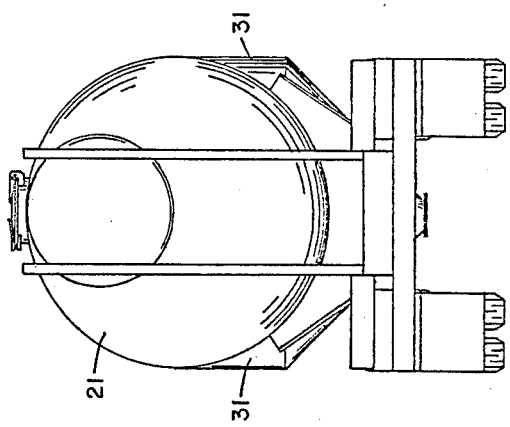
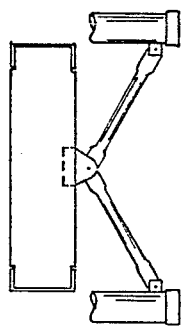
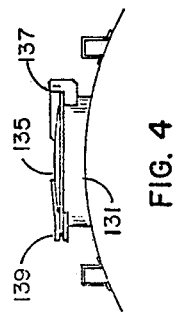
FIG. 1
FIG. 2
FIG. 3
FIG. 4

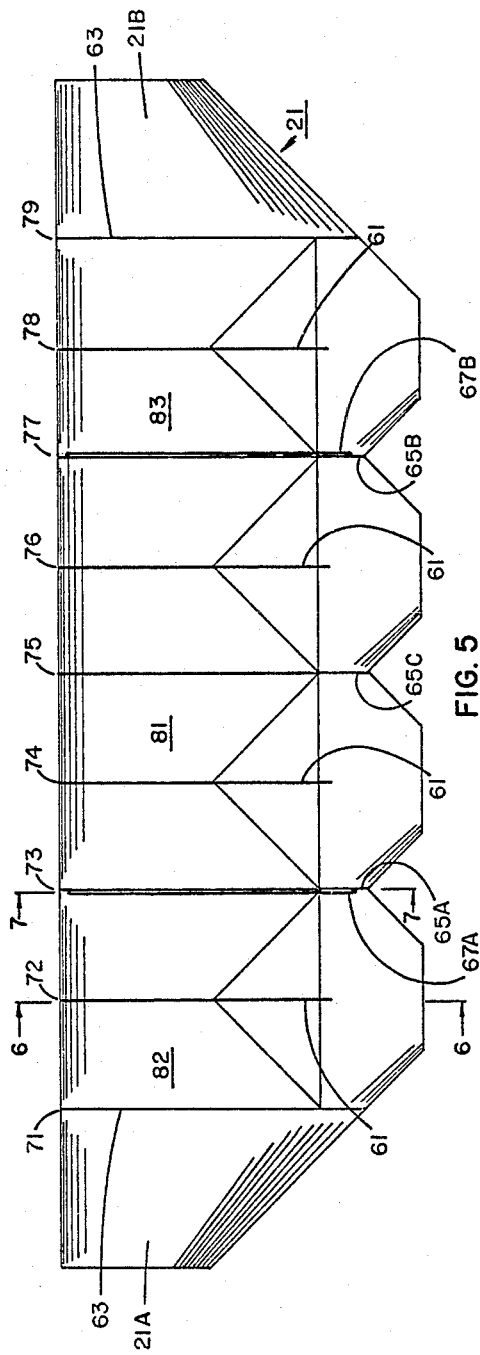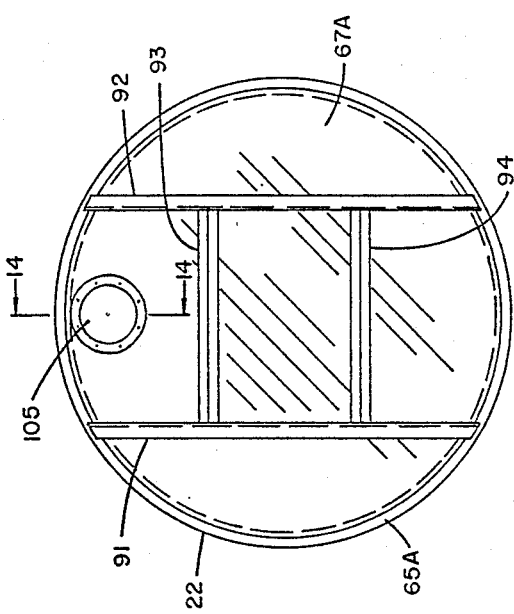

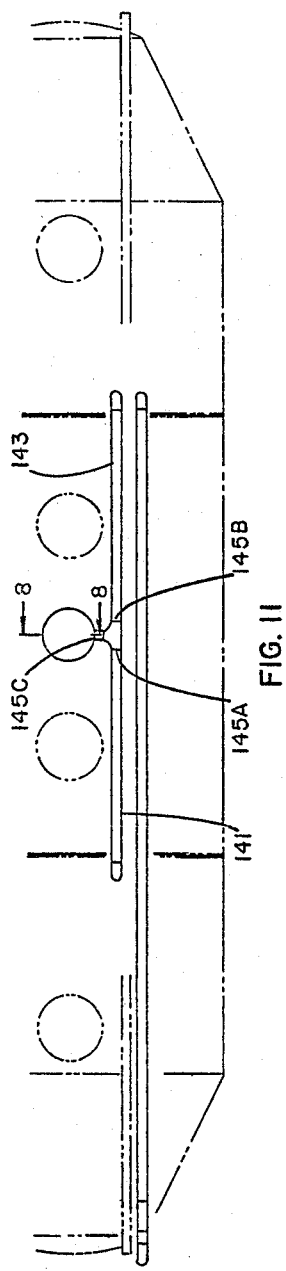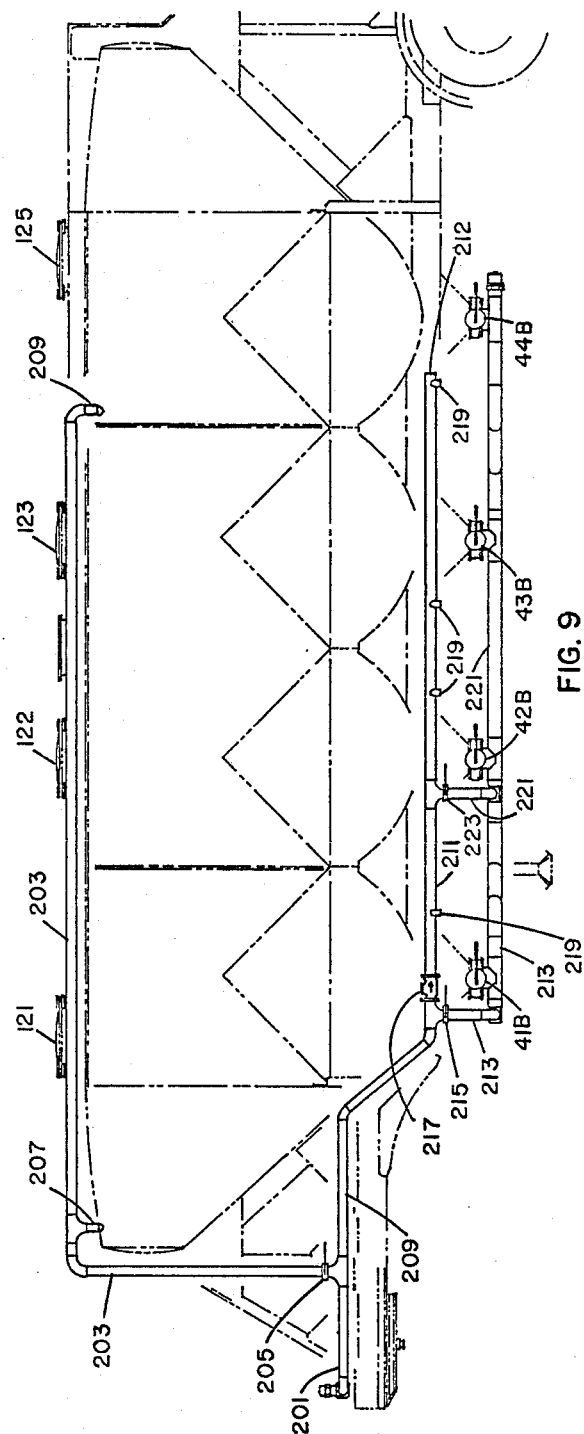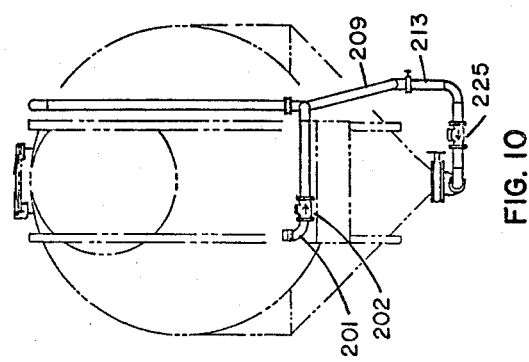

COMPARTMENTALIZED PNEUMATIC VESSEL FILTERING AND UNLOADING SYSTEM

BACKGROUND OF THE INVENTION

U.S. Pat. No. 3,420,419 discloses a material holding vessel or tank supported by a frame and wheels which is pulled by a tractor for transportation material over roads or highways. These vessels have a high strength to weight ratio and have special application in the transportation of dry flowable bulk material such as fine granular sand, chemicals, etc. In order to increase profits, the operator will haul a load of one type of dry flowable material to a distant destination and, if possible, return with a load of another type of dry flowable material. This procedure has required the vessel to be washed after the first load is unloaded and before the return load is loaded, which can be a time consuming and costly process. In addition, if there are no washing facilities available, the vessel cannot be washed thereby preventing a return load.

SUMMARY OF THE INVENTION

It is an object of the invention to provide a practical and economic system which allows a pneumatic vessel to be used for transporting one type of dry flowable material to a destination and another type of dry flowable material on the return trip without the necessity of washing the vessel at the destination prior to returning.

The system comprises a transportable vessel formed by enclosing wall structure. At least one bulkhead separates the vessel into at least two compartments for carrying dry flowable material. The wall structure of the vessel at its upper end has two separate openings extending therethrough leading to the two compartments respectively for receiving dry flowable material into the two compartments. Two lids are provided for closing the two openings respectively whereby the vessel comprising the two openings may be pressurized with air. A passageway extends between the two compartments for equalizing the pressure therein. A filter extends across the passageway for blocking the flow of dry flowable material through the passageway, but allowing the flow of air therethrough. At least two separate material discharge means are coupled to the wall structure of the vessel at its lower end and which lead to the two compartments respectively for removing dry flowable material from each of the compartments. A pneumatic air conduit is coupled to one of the compartments for pressurizing said one compartment whereby both of the compartments will be equally pressurized by way of the passageway during the removal of dry flowable material from any one of the two compartments. by way of its discharge means.

In the preferred embodiment, two spaced apart bulkheads separate the vessel into three compartments comprising a center compartment and two end compartments for carrying dry flowable material. The wall structure of the vessel at its upper end has at least three openings extending therethrough leading to the three compartments respectively for receiving dry flowable material into the three compartments. Three lids are provided for closing the three openings respectively whereby the vessel comprising the three compartments may be pressurized with air. Passageway means extend between the two end compartments and the center compartment for equalizing the pressure therein. Filter means extends across said passageway means for blocking the flow of dry flowable material through said passageway means but allowing the flow of air therethrough. At least three separate material discharge means are coupled to the wall structure of the vessel at its lower end and which lead to the three compartments respectively for removing dry flowable material from each of the compartments. A first material discharge conduit is coupled to the material discharge means of the two end compartments for directing the flow of dry flowable material removed from the two end compartments away from the vessel. A second material discharge conduit is coupled to the material discharge means of the center compartment for directing the flow of dry flowable material removed from the center compartment away from the vessel. A pneumatic conduit means is coupled to the two end compartments for pressurizing the two end compartments whereby all three of the compartments will be equally pressurized by way of said passageway means during the removal of dry flowable material from said two end compartments or from said center compartment by way of their discharge means and discharge conduit respectively.

In the embodiment disclosed, said passageway means comprises a passageway extending through the upper portion of each of the bulkheads and said filter means comprises a filter extending across each of said passageways.

An exterior conduit also may be coupled to the two end compartments and to the center compartment and a filter is located across the opening of the exterior conduit for blocking the flow of dry flowable material through the exterior conduit but allowing the flow of air therethrough.

BRIEF DESCRIPTION OF THE DRAWINGS

FIG. 1 is a side elevational view of a transportable vessel supported by a frame and wheels which incorporate the invention. In this Figure the air supply and blow-down piping or conduits are not shown.

FIG. 2 is a rear view of the vessel, frame, and wheels of FIG. 1.

FIG. 3 is an end view of the frame showing the landing gear attached thereto.

FIG. 4 is a end view of one of the upper loading domes with its lid.

FIG. 5 is a schematic cross-sectional view of the vessel of FIG. 1 taken through its length. The upper domes and the lower ends of the hoppers are not shown.

FIG. 6 is a cross-sectional view of FIG. 5 taken along lines 6—6 thereof.

FIG. 7 is a cross-sectional view of FIG. 5 taken along lines 7—7 thereof.

FIG. 9 is a side view of the pneumatic air supply and blow-down piping of the vessel.

FIG. 10 is a front end view the piping of FIG. 9.

FIG. 11 is a top plan view of a portion of the vessel illustrating the pneumatic air supply piping and piping connecting the outer end compartments with the center compartment.

DESCRIPTION OF THE PREFERRED EMBODIMENT

Figure 8:
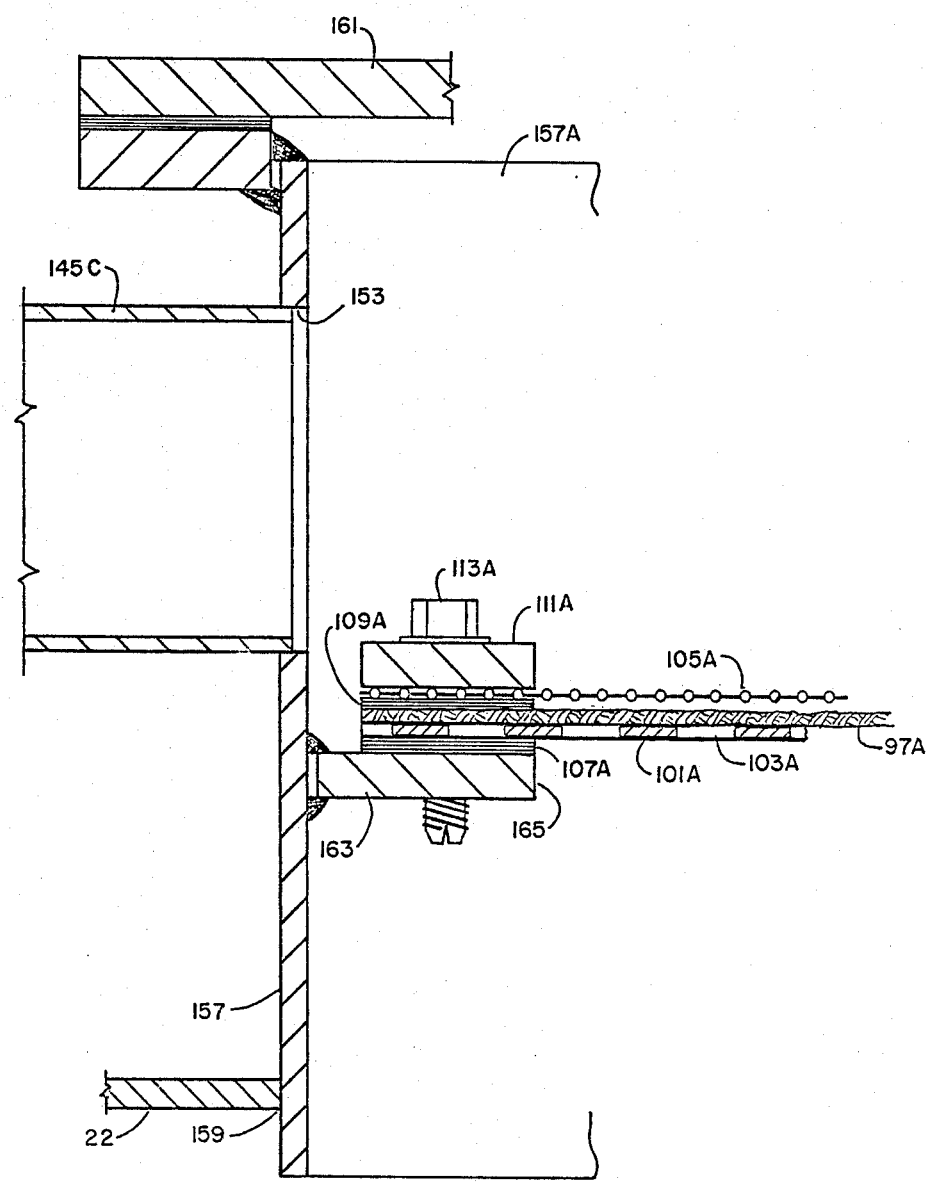
FIG. 8 is an enlarged cross-sectional view of FIG. 11 taken along lines 8—8 thereof.

Referring to FIGS. 1, 2, and 5 of the drawings, there is disclosed an elongated vessel or housing 21 comprising two transition end portions 21A and 21B and an elongated central portion 21C. Between positions 71 and 79, the central housing portion 21C is cylindrical in shape except for the lower diaper sections 31-34 and lower discharge members or hoppers 41-44 which are generally funnel shaped. The diaper sections 31-34 define circular arcs all of which have the same radius. The cylindrical housing portion 21C has four U-shaped lower sections removed as seen in a side plan view thereof and the four diaper sections 31-34 on each side of the housing portion 21C are connected to the edges of the cylindrical housing portion surrounding the removed sections such that the diaper sections 31-34 extend straight downward from the cylindrical housing portion 21C as seen in FIGS. 2 and 6. The upper ends of the discharge members 41-44 are connected to the lower ends of the diaper sections 31-34 respectively with the ends of adjacent discharge members being connected together and with the outer ends of discharge members 41 and 44 being connected to the lower ends of the transition end sections 21A and 21B respectively. The lower portions of the discharge members are cone shaped with their smaller ends 41A-44A extending directly below the vessel. The exterior structure of the vessel 21 is generally the same as that disclosed in the U.S. Pat. No. 3,420,419 which is hereby incorporated by reference. The vessel 21 is connected to and supported by a frame 51 having wheels 52 at its rear end and connection means 53 at its front end for connection to a tractor for transporting the vessel 21 on the roads. Plate members 55 are connected between the frame 51 and the discharge members 41-44 above the frame for support purposes. A landing gear 57 having telescoping legs is attached to the front portion of the frame 51 for supporting the frame when not connected to a tractor.

Referring to FIGS. 5-7 U-shaped members 61 located on the inside of the vessel 21 are connected to and support the wall structure 22 of the vessel at positions 72, 74, 76, and 78. Ring shaped members 63 (with their lower ends removed) located on the inside of the vessel 21 are connected to and support the wall structure 22 of the vessel at positions 71 and 79. Ring shaped members 65A, 65B and 65C located on the inside of the vessel 21 are connected to and support the wall structure 22 of the vessel 21 at positions 73, 77, and 75.

Circular bulkheads 67A and 67B are connected to the two rings 65A and 65B located at positions 73 and 75 separating the vessel 21 into three compartments; a central compartment 81 formed between the two bulkheads 67A and 67B; and two end compartments 82 and 83 formed to the left and right of bulkheads 67A and 67B respectively for receiving, transporting, and discharging dry flowable bulk material. The interior of compartment 82 extends through its ring 63 and U-shaped member 61; the interior of compartment 83 extends through its ring 63 and U-shaped member 61; and the interior of compartment 81 extends through its U-shaped members 61 and its ring 65C. Hopper 41 is used to discharge the material from compartment 82; hoppers 42 and 43 are used to discharge the material from compartment 81; and hopper 44 is used to discharge the material from compartment 83.

Figure 14:
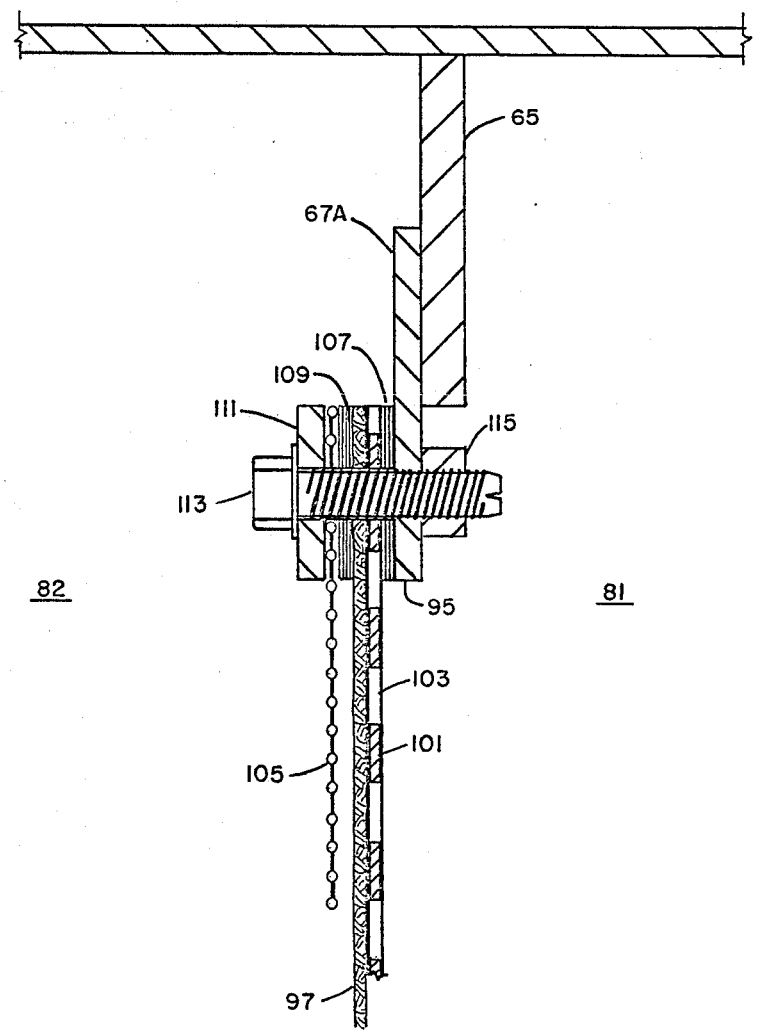
FIG. 14 is an enlarged partial cross-sectional view of FIG. 7 taken along lines 14—14 thereof.

The two bulkheads 67A and 67B are identical and reference is made to FIGS. 7 and 14 for a description of one of the bulkheads 67A. It comprises a circular metal plate having angle iron members 91-94 secured to the side that faces away from the compartment 81 for support purposes. Formed through the upper end of the bulkhead 67A is a circular opening 95 across which is located a filter 97. The filter 97 in one embodiment is formed of fabric which will block the passage of dry flowable material, such as fine granular sand, chemicals, etc., greater than 5 microns in diameter or size, but will allow the passage of air therethrough. A metal plate 101 having perforations 103 formed therethrough is supported on one side of the filter 97 and hardware cloth 105 is supported on the other side of the filter 97. The hardware cloth 105 may be 2×2 wire mesh. The filter 97 and the perforated plate 101 are secured between two rings 107 and 109 and the wire mesh 105 is secured between ring 109 and outer ring 111 with the rings 107, 109 and 111 being secured to the bulkhead 67A around the circular opening 95 by bolts 113 and nuts 115. Thus, the rings 107, 109, and 111 secure the filter 97, the perforated plate 101, and the hardware cloth 105 across the opening 95 of the bulkhead 67A. Rings 107 and 109 are formed of a suitable plastic material for sealing purposes. In one embodiment, a cylindrical member 21C having an inside diameter of about 95½ inches, the opening 95 may have an inside diameter of 12 inches the center of which is located 37¼ inches from the axis of the cylindrical shell 21C. The bulkhead 67B located at position 77 has an identical opening 95 with an identical filter 97, perforated plate 101, and hardware cloth 105 extending thereacross. The filter assembly of the bulkhead 67A at position 73 is located on the side of this bulkhead 67A facing the compartment 82 and the filter assembly of the bulkhead 67B at position 77 is located on the side of this bulkhead 67B facing the compartment 83. Angle irons 91-94 are attached to the side of the bulkhead 67B facing the compartment 83.

Figure 15:
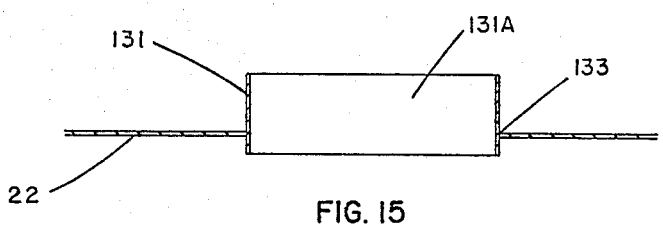
FIG. 15 is a cross-sectional view of one of the upper loading domes without its lid.

Loading domes 121-125 are located at the top of the vessel 21. Dome 121 is employed for loading material into compartment 82; domes 122 and 123 are employed for loading material into compartment 81; and dome 124 is employed for loading material into compartment 83. All of the domes 121-125 are identical and reference will be made to FIGS. 4 and 15 for a description of dome 121. Dome 121 comprises a short hollow cylindrical member 131 secured in a circular opening 133 formed through the wall structure 22 of the vessel 21 with a lid 135 at its top end for opening and closing the opening 131A formed through the cylindrical member 131 and which leads to the chamber 81. The lid 135 is hinged to the cylindrical wall 131 by way of a hinge 137. A conventional lock 139 is employed for allowing the lid to be tightly sealed over the opening 131A of the cylindrical member 131 whereby the vessel may be pressurized.

Figure 12:
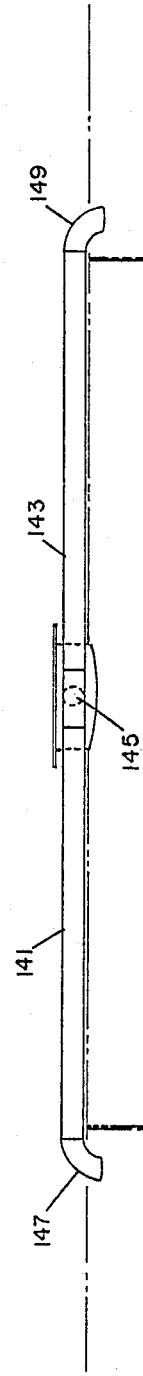
FIG. 12 is a partial side view of the upper portion of the vessel illustrating pipe connecting the outer end compartments with the center compartment.

Referring to FIGS. 8, 11, and 12 upper pipe members 141 and 143 have two ends connected to two ends 145A and 145B of a T member 145 and elbows 147 and 149 connected to their other ends which extend through apertures formed through the wall structure 22 of the vessel into compartments 82 and 83 respectively. The central end 145C of the T member 145 is connected to an opening 153 formed through a hollow cylindrical member 157 which extends into the compartment 81 through an opening 159 formed through the wall structure 22 of the vessel. A plate 161 is connected to the upper end of the cylindrical member 157 sealing its opening 157A at the top. Located within the cylindrical member 157 and below the conduit 145C of the T member 145 is a filter assembly similar to that of FIG. 14. The filter assembly of FIG. 8 comprises a filter fabric 97A and a perforated plate 101A having perforations 103A located on one side of the filter fabric 97A and a wire mesh 105A located on the other side. The perforated plate 101A and the filter fabric 97A are supported between ring shaped members 107A and 109A and the wire mesh 105A is supported between the ring shaped member 109A and a ring 111A which are secured to a ring 163 by bolts 113A. Ring 163 is secured to the inside of the cylindrical member 157 and has a circular aperture 165 formed therethrough. The filter assembly including the filter 97A thus is secured across the opening 165 in the cylindrical member 157. The filter fabric 97A can pass air therethrough but will block the passage of material having a diameter greater than 5 microns. Thus, the filters of FIGS. 8 and 14 will allow the passage of air therethrough but will block the passage of dry flowable material having a diameter of greater than 5 microns whereby it will block the passage of the dry flowable bulk material carried by the vessel.

With the system shown, when compartments 81 and 83 are pressurized, compartment 82 will be equally pressurized by the flow of air thereto from the compartments 81 and 83 by way of the openings 95 and filters 97 formed through the bulkheads 67A and 67B at positions 73 and 77 and also by the flow of air thereto through the piping system 141, 143, and the opening 165 and the filter 97A located within the cylindrical member 157 of the filter dome filter assembly. Pressurized air an flow through the filters however the filters will block the passage therethrough of the dry flowable bulk material in the vessel. The purpose of the piping system 141, 143 and the filter dome assembly 157 including the filter 97A is to provide a backup system for equalizing the pressure in the compartment 81–83 in the event that the interior filters 97 of the two bulkheads 67A and 67B become clogged.

Figure 13:
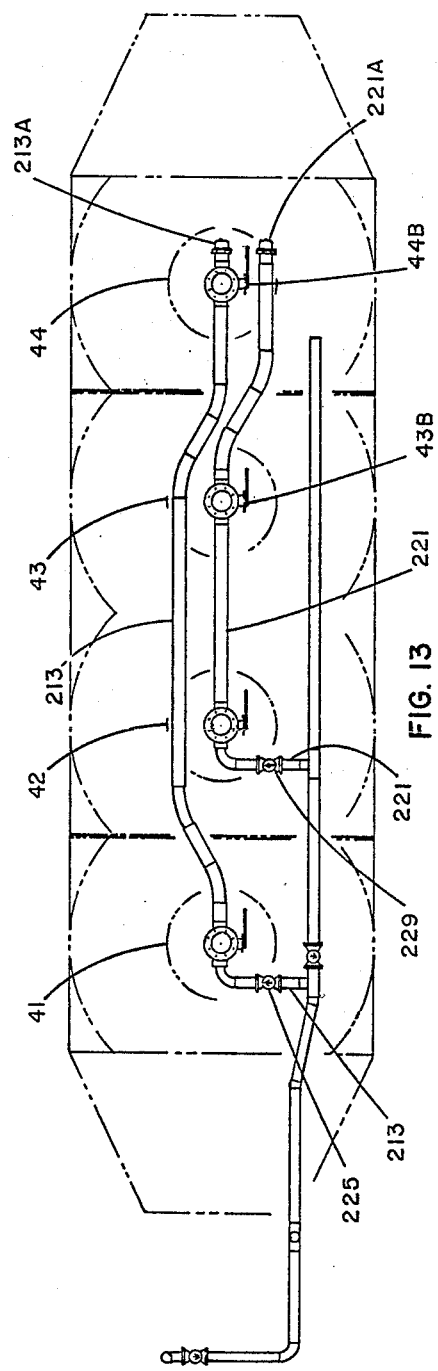
FIG. 13 illustrates the discharge conduits for discharging material from the compartments of the vessel.

Referring now to FIGS. 9, 10, and 13, the air supply and blow-down piping system will be described. A main air supply pipe 201 is provided which will be connected to a source of air under pressure (not shown) when the vessel 21 is to be unloaded. The air pressure employed may be of the order 14.5 psig. The pipe 201 has a one-way valve 202 coupled thereto. The pipe 201 is connected to an upper pipe 203 by way of a manually operable valve 205. The pipe 203 extends above the vessel 21 and has an outlet 207 leading into compartment 82 and an outlet 209 leading into compartment 83. The pipe 201 also is connected to a pipe 209 which in turn is connected to a pipe 211 and to a product discharge pipe 213 by way of manually operable valve 215. Pipe 211 has a one-way valve 217 coupled thereto and aerating hoses 219 connected thereto and to the lower portions of the hoppers 41–44 above their lower ends 41A–41B. The connections of the hoses 219 to the hoppers 41–44 are not shown but are similar to that shown in U.S. Pat. No. 3,420,419. Pipe 211 also is connected to a product discharge pipe 221 by way of an manually operable valve 223. Manually operable valves 41B–44B are connected to the lower ends 41A–44A of the hoppers 41–44 for controlling the discharge of products through the lower ends of the hoppers. Discharge pipe 213 includes a one-way valve 225 and is connected to the lower ends of hoppers 41 and 44. The downstream end 213A of pipe 213 is connectable to another pipe (not shown) for directing the flow of the product away from the vessel. When the valves 41B and 44B are opened, the product in the hoppers 41 and 44 will be discharged into pipe 213 for flow to suitable storage facilities.

The discharge pipe 221 includes a one-way valve 229 and is connected to the lower ends of hoppers 42 and 43. The downstream end 221A of the pipe 221 is connectable to a pipe (not shown) for flowing the material in the pipe 221 to a desirable storage facility. When the valves 42B and 43B are opened, the product in the hoppers 42 and 43 flow into the pipe 221 and then to the desired storage facility.

There now will be described the manner in which the vessel may be used to transport one type material to a destination and to transport another type of material on a return trip without the need of washing out the interior of the vessel. At the main place of operation, either compartment 81 or compartments 82 and 83 will be loaded with dry flowable material. Loading is through domes 122 and 123 or 121 and 125. Assume that the material is to be loaded into compartment 81. Loading is carried out through domes 122 and 123 with conventional loading techniques after which all of the domes will be closed and all of the manually operable valves in the piping system will be closed. At the point of destination, unloading of the compartment 81 is carried out as follows. The pipe 201 is connected to a source of air pressure and the valve 205 is opened whereby compartments 82 and 83 will be pressurized initially and compartment 81 will be equally pressurized by the flow of air through the openings 95 of the bulkheads 67A and 67B and filters 97 and also by the flow of air through pipes 141, 143 and the dome 153 and its filter 97A. The filters 97 and 97A will allow the flow of air therethrough but will block the flow of the dry flowable material. By equalizing the pressure in all of the compartments, the bulkheads 67A and 67B do not have to be significantly beefed up and hence can be constructed in an economic manner. The compartment 81 is unloaded by opening valve 223 and valves 42B and 43B. This allows the air pressure in the compartment 81 and aeration air pressure from the hoses 219 leading to the bottom of the hoppers 42 and 43 to discharge the material through the bottom ends of the hoppers into the pipe 221 wherein the material in the pipe 221 then is discharged and flowed out of its downstream end 221A by way of the air pressure injected into the pipe 221 from the pipe 211. After the compartment 81 is unloaded all of the valves of the piping system will be closed. The operator then can load compartments 82 and 83 with a different type of dry flowable material through the domes 121 and 125 after which they will be closed for transportation of the material in the compartments 82 and 83 to the main place of operation on the return trip. Upon arriving at the main place of operation, the compartments 82 and 83 are unloaded by coupling a source of air pressure to the pipe 201 and opening valve 205 to pressurize the compartments 82 and 83 and hence the central compartment 81. The compartments 82 and 83 are unloaded by opening valve 215 and valves 41B and 44B to allow the air pressure in the vessel and the aerating air pressure through the hoses 219 leading to the hoppers 41 and 44 to discharge the material from the hoppers 41 and 42 into the product discharge conduit 213. The air pressure injected into the pipe 213 from pipe 209 flows the material through the pipe 213 to its downstream end 213A for flow to the desired storage facility.

At this point, the interior of the vessel may be washed or another trip and return trip may be had by loading the compartment 81 with the first type of material for transportation to the point of destination which is then unloaded and the compartments 82 and 83 unloaded with the second type of material and returned for unloading without the necessity of further washing of the interior of the vessel.

By having three compartments, with either compartment 81 or compartments 82 and 83 loaded, the vessel 21 will be balanced.

Although not showing, the downstream end 212 of pipe 211 will be closed.

It is to be understood that different filters 97 and 97A may be employed which can block the passage of particles having diameters less than five microns, if desired.

I claimed:

1. A system for receiving, transporting, and discharging dry flowable material, comprising:
   a transportable vessel formed by enclosing wall structure,
   at least one bulkhead separating said vessel into at least two compartments for carrying dry flowable material,
   said wall structure of said vessel at its upper end having two separate openings extending therethrough leading to said two compartments respective for receiving dry flowable material into said two compartments,
   two lids for closing said two openings respectively whereby said vessel comprising said two compartments may be pressurized with air,
   a passageway extending between said two compartments for equalizing the pressure therein,
   a filter extending across said passageway for blocking the flow of dry flowable material through said passageway but allowing the flow of air therethrough,
   two separate material discharge means coupled to said wall structure of said vessel at its lower end and leading to said two compartments respectively for removing dry flowable material separately from each of said compartments, and
   a pneumatic air conduit coupled to one of said compartments for use for pressurizing said one compartment, when said two lids are closed, whereby both of said compartments will be equally pressurized by way of said passageway during the removal of dry flowable material from any one of said compartments by way of its discharge means.

2. The system of claim 1, wherein:
   said bulkhead extends across opposite sides of and between the upper and lower ends of said wall structure of said vessel separating said vessel into two side-by-side compartments,
   said passageway extends through the upper portion of said bulkhead.

3. The system of claim 2, comprising:
   an exterior conduit means coupled to said two compartments and extending between said two compartments exterior of said vessel, and
   a filter extending across the opening of said exterior conduit means for blocking the flow of dry flowable material through said exterior conduit means but allowing the flow of air therethrough.

4. The system of claim 1 wherein:
   said passageway extends through the plane of said bulkhead within said vessel.

5. The system of claim 1 wherein:
   said passageway is formed by an exterior conduit means coupled to said two compartments.

6. The system of claim 1 wherein:
   said passageway is formed by an exterior conduit means coupled to the upper portions of said two compartments.

7. The system of claim 1 wherein:
   said two separate material discharge means comprise discharge conduits,
   means for injecting air under pressure into said discharge conduits of two separate material discharge means for flowing the dry flowable material through said discharge conduits.

8. The system of claim 7 comprising:
   a separate air conduit means coupled to the lower end of each of said two compartments for injecting air under pressure therein for facilitating the discharge of dry flowable material separately from each of said two compartments by way of said separate material discharge means, respectively.

9. A system for receiving, transporting, and discharging dry flowable material, comprising:
   an elongated transportable vessel formed by enclosing wall structure,
   means for supporting aid vessel such that its length is generally horizontal,
   two spaced apart bulkheads separating said vessel into three compartments comprising a center compartment and two end compartments for carrying dry flowable material,
   said wall structure of said vessel at its upper end having three separate openings extending therethrough leading to said three compartments respective for receiving dry flowable material into said three compartments,
   three lids for closing said three openings respectively whereby said vessel comprising said three compartments may be pressurized with air,
   passageway means extending between said two end compartments and said center compartment for equalizing the pressure therein,
   filter means extending across said passageway means for blocking the flow of dry flowable material through said passageway means but allowing the flow of air therethrough,
   three separate material discharge means coupled to said wall structure of said vessel at its lower end and leading to said three compartments respectively for removing dry flowable material from each of said compartments,
   a first material discharge conduit coupled to said material discharge means of said two end compartments for directing the flow of dry flowable material removed from said two end compartments,
   a second material discharge conduit coupled to said material discharge means of said center compartment for directing the flow of dry flowable material removed form said center compartment,
   a pneumatic conduit means coupled to said two end compartments for pressurizing said two end compartments when said three lids are closed whereby all three of said compartments will be equally pressurized by way of said passageway deans during the removal of dry flowable material from said two end compartments or from said center compartment by way of their discharge means and discharge conduit respectively.

10. The system of claim 9, wherein:
said bulkheads extend across opposite sides and between the upper and lower ends of said wall structure of said vessel,
said passageway means comprises a passageway extending through the upper portion of each of said bulkheads,
said filter mean comprises a filter extending cross each of said passageways.

11. The system of claim 10, comprising:
an exterior conduit means coupled to said two end compartments and said center compartment and extending between two end compartments and said center compartment exterior of said vessel, and
a filter extending across the opening of said exterior conduit means for blocking the flow of dry flowable material through said exterior conduit means but allowing the flow of air therethrough.

12. A system for receiving, transporting, and discharging dry flowable material, comprising:
an elongated transportable vessel formed by enclosing wall structure,
means for supporting said vessel such that its length is generally horizontal,
two spaced apart bulkheads separating said vessel into three compartments comprising a center compartment and two end compartments for carrying dry flowable material,
said wall structure of said vessel at its upper end having three separate openings extending therethrough leading to said three compartments respectively for receiving dry flowable material into said three compartments,
three lids for closing said three openings respectively whereby said vessel comprising said three compartments may be pressurized with air,
passageway means extending between said two end compartments and said center compartment for equalizing the pressure therein,
filter means extending across said passageway means for blocking the flow of dry flowable material through said passageway means but allowing the flow of air therethrough,
three separate material discharge means coupled to said wall structure of said vessel at its lower end and leading to said three compartments respectively for removing dry flowable material from each of said compartments, and
a pneumatic conduit means coupled to at least one of said compartments for use for use for pressurizing at least said one compartment whereby all three of said compartments generally will be equally pressurized by way of said passageway means during the removal of dry flowable material from said compartments.

13. The system of claim 12 wherein:
said pneumatic conduit means is coupled to said two end compartments for pressurizing said two end compartments whereby all three of said compartments generally will be equally pressurized by way of said passageway means during the removal of dry flowable material from said two end compartments or from said center compartment by way of their discharge means respectively.

14. The system of claim 12 comprising:
a first material discharge conduit coupled to said material discharge means of said two end compartments for directing the flow of dry flowable material removed from said two end compartments, and
a second material discharge conduit coupled to said material discharge means of said center compartment for directing the flow of dry flowable material removed from said center compartment.

15. The system of claim 14 wherein:
said first material discharge conduit is coupled only to said material discharge means of said two end compartments and said second material discharge conduit is coupled only to said material discharge means of said center compartment.

16. The system of claim 15 comprising:
means for injecting air under pressure into said first material discharge conduit and said second material discharge conduit for flowing the dry flowable material through said first and second material discharge conduits.

17. The system of claim 16 comprising:
a separate air conduit means coupled to the lower end of each of said compartment for injecting air under pressure therein for facilitating the discharge of the dry flowable material from said compartments.

18. The system of claim 12 wherein:
said passageway means comprises two passageways extending through the planes of said two spaced apart bulkheads respective within said vessel.

19. The system of claim 12 wherein said passageway means comprises two passageways extending through the planes of said two apart bulkheads at their upper portions respectively within said vessel.

20. The system of claim 12 wherein:
said passageway means is formed by an exterior conduit means coupled to said two end compartments and having an intermediate portion coupled to said center compartment, and
said filter means extends at least across said intermediate portion of said exterior conduit means for blocking the flow of dry flowable material therethrough but allowing the flow of air therethrough.

21. The system of claim 12 wherein:
said passageway means is formed by an exterior conduit means coupled to the upper portions of said two end compartments and having an intermediate portion coupled to the upper portion of said center compartment,
said filter means extends at least across said intermediate portion of said exterior conduit means for blocking the flow of dry flowable material therethrough but allowing the flow of air therethrough.

22. The system of claim 12 wherein said two end compartments have generally the same volumes and the volume of said center compartment is greater than the volume of either of said two end compartments.

23. The system of claim 12 wherein said passageway means provides a flow path between said three compartments at their upper portions.

24. The system of claim 17 wherein:
said passageway means provides a flow path between said three compartments at their upper portions,
said means for supporting said vessel comprises wheels for rolling on a road or the like.

* * * * *